(12) United States Patent
Li

(10) Patent No.: US 10,999,721 B2
(45) Date of Patent: May 4, 2021

(54) COMMUNICATION IDENTIFIER BINDING PROCESSING METHOD AND TERMINAL

(71) Applicant: Huawei Technologies Co., Ltd., Shenzhen (CN)

(72) Inventor: Haoran Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 38 days.

(21) Appl. No.: 16/464,939

(22) PCT Filed: Mar. 23, 2017

(86) PCT No.: PCT/CN2017/077844
§ 371 (c)(1),
(2) Date: May 29, 2019

(87) PCT Pub. No.: WO2018/098941
PCT Pub. Date: Jul. 6, 2018

(65) Prior Publication Data
US 2020/0021963 A1    Jan. 16, 2020

(30) Foreign Application Priority Data
Nov. 30, 2016   (CN) .......................... 201611084564.3

(51) Int. Cl.
*H04W 4/60*   (2018.01)
*H04W 4/50*   (2018.01)
(Continued)

(52) U.S. Cl.
CPC ............... *H04W 4/60* (2018.02); *H04W 4/50* (2018.02); *H04W 12/00409* (2019.01); *H04W 12/06* (2013.01)

(58) Field of Classification Search
CPC .... H04W 4/60; H04W 4/50; H04W 12/00409
See application file for complete search history.

(56) References Cited

U.S. PATENT DOCUMENTS

2010/0153249 A1\* 6/2010 Yuan .................. G06Q 20/3255
705/34
2012/0047227 A1    2/2012 Haggerty et al.
(Continued)

FOREIGN PATENT DOCUMENTS

| CN | 102685601 A | 9/2012 |
| CN | 103746792 A | 4/2014 |

(Continued)

*Primary Examiner* — Min Jung
(74) *Attorney, Agent, or Firm* — Slater Matsil, LLP

(57) ABSTRACT

Embodiments of this application disclose a communication identifier binding processing method and a terminal. The method includes: first obtaining, by the terminal, a first binding relationship between a first communication identifier and at least two services, and displaying the first binding relationship on an interface; when the first communication identifier is replaced by a second communication identifier, then removing the first binding relationship based on a binding update operation triggered by a user, and establishing a second binding relationship between the second communication identifier and the at least two services; and finally displaying the second binding relationship on the interface.

20 Claims, 9 Drawing Sheets

(51) Int. Cl.
*H04W 12/00* (2021.01)
*H04W 12/06* (2021.01)

(56) References Cited

U.S. PATENT DOCUMENTS

| | | | |
|---|---|---|---|
| 2012/0054673 A1* | 3/2012 | Kim | H04M 1/2747 |
| | | | 715/784 |
| 2012/0136984 A1* | 5/2012 | Wang | H04L 67/16 |
| | | | 709/223 |
| 2013/0007728 A1 | 1/2013 | Oh et al. | |
| 2013/0130651 A1 | 5/2013 | Deasy et al. | |
| 2013/0237200 A1 | 9/2013 | Nystrom et al. | |
| 2013/0293786 A1 | 11/2013 | Li | |
| 2014/0349633 A1 | 11/2014 | Sajadieh et al. | |
| 2015/0079961 A1 | 3/2015 | Maguire et al. | |
| 2015/0237029 A1* | 8/2015 | Zhang | H04L 65/403 |
| | | | 726/6 |
| 2016/0088151 A1* | 3/2016 | Dai | H04M 3/42374 |
| | | | 455/414.1 |
| 2016/0321628 A1* | 11/2016 | Xu | G06Q 20/12 |
| 2017/0272447 A1* | 9/2017 | Chen | H04L 29/08 |
| 2017/0293456 A1* | 10/2017 | Yao | H04N 1/00347 |
| 2018/0375726 A1* | 12/2018 | Xia | H04L 41/20 |
| 2019/0174302 A1* | 6/2019 | Zhou | H04L 63/0861 |
| 2019/0289015 A1* | 9/2019 | Chen | G06Q 20/02 |

FOREIGN PATENT DOCUMENTS

| | | |
|---|---|---|
| CN | 104206000 A | 12/2014 |
| CN | 104320756 A | 1/2015 |
| CN | 105072178 A | 11/2015 |
| CN | 105451199 A | 3/2016 |
| CN | 105472596 A | 4/2016 |
| CN | 105897873 A | 8/2016 |

* cited by examiner

COMMUNICATION IDENTIFIER BINDING PROCESSING METHOD AND TERMINAL

CROSS-REFERENCE TO RELATED APPLICATIONS

This application is a National Stage of International Application No. PCT/CN2017/077844, filed Mar. 23, 2017, which claims priority to Chinese Patent Application No. 201611084564.3, filed on Nov. 30, 2016. Both of the aforementioned applications are hereby incorporated by reference in their entireties.

TECHNICAL FIELD

This application relates to the field of communications technologies, and in particular, to a communication identifier binding processing method and a terminal.

BACKGROUND

With development of a communications technology, an increasing quantity of services are implemented on a terminal (such as a smartphone, a tablet computer, or a wearable device). To facilitate user identity authentication and unified management, for many services, a communication identifier (such as a mobile number or an international mobile subscriber identity of a terminal) used by a user needs to be bound to a corresponding application or bank card of a service. In this way, a communication identifier has more functions and becomes more important.

Currently, as a quantity of requirements for binding a communication identifier increases, when the user changes the communication identifier, the user needs to unbind each service from the communication identifier and bind each service with a new communication identifier by following a binding and unbinding procedure indicated by a service provider. Sometimes the user even needs to go to a bank or another service site for manual processing. Moreover, the user does not remember a binding relationship, or is not clear about which services are bound to a phone number or which phone number is bound to a service. In these cases, processing efficiency of existing binding and unbinding is low.

SUMMARY

Embodiments of this application provide a communication identifier binding processing method and a terminal, so as to perform convenient association processing on a communication identifier and a service.

According to a first aspect, an embodiment of this application provides a communication identifier binding processing method. In this method, a terminal first obtains at least two services bound to a first communication identifier, and displays the first binding relationship between the first communication identifier and the at least two services on an interface. Then, when the terminal detects that the first communication identifier is replaced by a second communication identifier, the terminal removes the first binding relationship based on a binding update operation triggered by a user, establishes a second binding relationship between the second communication identifier and the at least two services, and finally displays the second binding relationship on the interface.

It can be learned that, according to the method provided by the first aspect, automatic unbinding and binding processing may be performed for the service that needs to be unbound from the communication identifier and bound to the another communication identifier, simplifying an operation step of the user, avoiding to memorize a complicated binding procedure by the user, and meeting a requirement of the user for automatic and intelligent quick communication identifier binding.

In an optional implementation, the terminal may use all services currently installed on the terminal as the at least two services whose first binding relationship with the first communication identifier is to be queried; or the terminal may alternatively query all the services ever installed on the terminal, and use them as the at least two services; or the terminal may alternatively record services used by the user on a web browser or another client, and use the services as the at least two services.

It can be learned that, according to this optional implementation, a selection scope of the at least two services may be expanded, making the terminal more automatic and intelligent.

In an optional implementation, the interface may be a list interface. The first binding relationship or the second binding relationship may be displayed on the interface. The terminal may receive, on the list interface, the binding update operation triggered by the user, remove the first binding relationship based on the binding update operation, and establish the second binding relationship between the second communication identifier and the at least two services.

It can be learned that, according to this optional implementation, the first binding relationship or the second binding relationship may be displayed as lists on the list interface, facilitating the binding update operation performed by the user on the list interface and improving unbinding and binding processing efficiency.

In an optional implementation, the terminal may also identify related service information of a service installed on the terminal, query an unbind command, a bind command, and a query command related to the service information, and save the unbind command, the bind command, and the query command as list items on the terminal or a third-party server. Then, the terminal obtains the related unbind command and bind command from the list items based on the binding update operation triggered by the user, unbinds the at least two services from the first communication identifier according to the unbind command, and binds the at least two services to the second communication identifier according to the bind command.

It can be learned that, according to this optional implementation, the command used for updating the binding relationship may be saved on the terminal or the third-party server in advance. When the user triggers the binding update operation, the terminal may directly invoke the command saved in advance to perform processing of updating the binding relationship, and the user does not need to perform query, simplifying an operation step.

In an optional implementation, the terminal obtains the first binding relationship between the first communication identifier and the at least two services. Specifically, the terminal first invokes the query command, related to the at least two services, in the list items, and then queries, according to the query command, whether the at least two services are bound to the first communication identifier. If a query result is that the at least two services are bound to the first communication identifier, it is determined that the first binding relationship is established between the first communication identifier and the at least two services.

It can be learned that, according to this optional implementation, a related binding status between a service and a communication identifier may be known. This facilitates viewing by the user, and facilitates different operations performed by the terminal based on query information.

In an optional implementation, if the terminal does not obtain the bind command or the unbind command associated with the at least two services, the terminal may display a user interface to prompt the user to manually update the binding relationship between the communication identifier and the at least two services. The terminal may further display on the user interface association information that is obtained through query and that is used to update the binding relationship between the communication identifier and the at least two services, to prompt the user to complete, based on the association information, an operation of manually updating the binding relationship.

The association information may be a searching result that is obtained from a network through searching and that is used for establishing the binding relationship between the communication identifier and the at least two services. The searching result may be displayed as a list item on the user interface.

It can be learned that, according to this optional implementation, a purpose of prompting the user to manually update the binding relationship between the communication identifier and the at least two services may be achieved. In addition, displaying the association information helps the user directly perform binding update processing based on the association information, and the user does not need to query the association information, simplifying an operation step of the user.

In an optional implementation, before the terminal removes the first binding relationship between the first communication identifier and the at least two services based on the binding update operation triggered by the user, and establishes the second binding relationship with the second communication identifier, the terminal may further prompt the user to verify authentication information when the user triggers the binding update operation. Then, the terminal receives the authentication information entered by the user. If the authentication information is valid, the terminal removes the first binding relationship between the first communication identifier and the at least two services, and establishes the second binding relationship with the second communication identifier.

It can be learned that this optional implementation can avoid that communication identifier update is caused by a misoperation of the user or an operation of another user, improving security and reliability of the terminal.

In an optional implementation, the at least two services may include an application-type service and a non-application-type service. The application-type service may be a social application, a shopping application, a game application, a video application, a tool application, or the like; and the non-application-type service may be a bank card or the like.

It can be learned that the terminal may manage the application-type service and the non-application-type service as unified service items, and management is no longer limited only to the application-type service, thereby expanding a service scope of communication identifier update by the terminal.

In an optional implementation, a form of the first communication identifier and the second communication identifier may be specifically an email address, a mobile number, an international mobile subscriber identity, or the like.

According to a second aspect, a terminal is provided. The terminal has a function of implementing terminal behavior in the foregoing first aspect or possible implementations of the first aspect. The function may be implemented by hardware, or may be implemented by hardware executing corresponding software. The hardware or software includes one or more modules corresponding to the foregoing function. The modules may be software and/or hardware. Based on a same invention conception, for a problem resolving principle of the terminal and a beneficial effect, refer to the foregoing first aspect and the possible method implementations of the first aspect, and a beneficial effect thereof. Therefore, for implementation of the terminal, refer to the foregoing first aspect and the possible method implementations of the first aspect, and details are not described herein.

According to a third aspect, a terminal is provided. The terminal includes: a memory, configured to store one or more programs; and a processor, configured to invoke a program stored in the memory to implement a solution in a method design of the foregoing first aspect. For an implementation of resolving a problem by the terminal and a beneficial effect, refer to the foregoing first aspect and the possible method implementations of the first aspect and a beneficial effect, and details are not described herein.

BRIEF DESCRIPTION OF THE DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of this application, and a person of ordinary skill in the art may derive other drawings from these accompanying drawings without creative efforts.

FIG. 4 (*b*) is a schematic diagram of a binding update result used for communication identifier binding according to an embodiment of this application;

DETAILED DESCRIPTION OF ILLUSTRATIVE EMBODIMENTS

The following describes embodiments of this application with reference to accompanying drawings in the embodiments of this application.

The embodiments of this application provide a communication identifier binding processing method and a terminal, to perform precise and convenient unbinding and binding on a communication identifier and a service, simplifying an operation step of a user. The following provides a respective detailed description.

For a better understanding of the communication identifier binding processing method and the terminal provided in the embodiments of this application, the following first describes a network architecture in the embodiments of this application.

Figure 1:
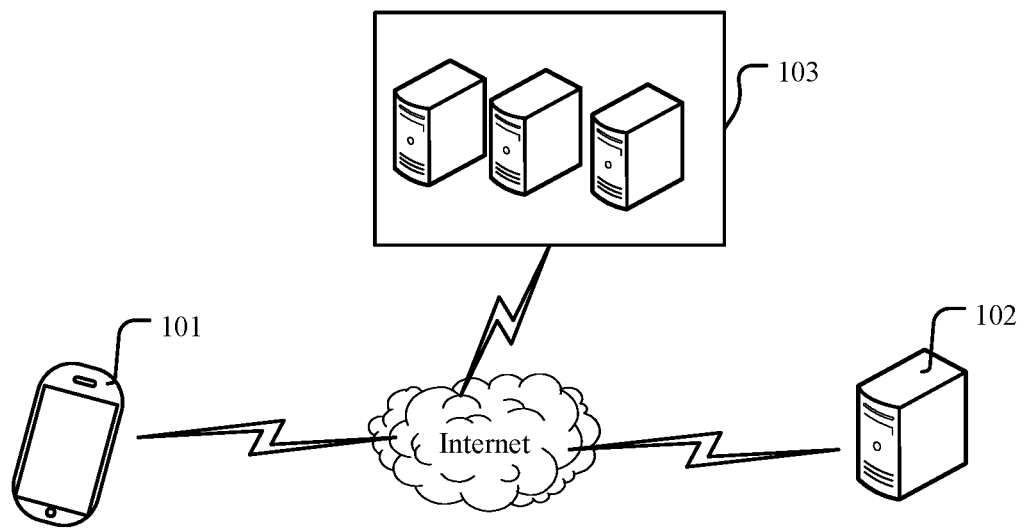
FIG. 1 is a schematic diagram of a network architecture used for communication identifier binding processing according to an embodiment of this application.

FIG. 1 is a schematic diagram of a network architecture used for communication identifier binding processing according to this application. In this embodiment of this application, the network architecture includes a terminal 101, a first server 102, and a second server 103. The terminal 101 may be an intelligent terminal 101 of any type. For example, the terminal 101 may be a smartphone, a tablet computer, a wearable device, a computer, a personal digital assistant (PDA), a mobile Internet device (MID), or another terminal for which a communication identifier may be configured. The first server 102 may be a trustworthy database server, text server, or the like, and may be configured to store important information or instruction of the terminal 101. The first server 102 may be an independent server or a server cluster, and this is not limited herein. The second server 103 may be a device that is provided by a service provider (such as a bank service provider or an application service provider) or an operator to manage and maintain services in a unified manner. The second server 103 may be an independent server or a server cluster, and this is not limited herein.

In the network architecture used for communication identifier binding processing shown in FIG. 1, a user uses the terminal 101 to access a network. When the user replaces a first communication identifier with a second communication identifier, the terminal 101 sends a query request to the first server 102. The query request is used to query whether a plurality of services on the terminal 101 is bound to the first communication identifier. After receiving the request from the terminal 101, the first server 102 returns a query command corresponding to the query request to the terminal 101. The terminal 101 sends the query command to the second server 103. The second server 103 returns a query result to the terminal 101. The terminal 101 displays on an interface a plurality of services bound to the first communication identifier, for viewing and management by the user.

Further, the user triggers a binding update operation on the interface. Based on the operation of the user, the terminal 101 invokes an unbind command on the second server 102 to unbind the plurality of services from the first communication identifier, invokes a bind command on the second server 102 to bind the plurality of services to the second communication identifier, and displays a latest binding result on the interface of the terminal 101.

In some feasible implementations, when detecting that the user replaces the first communication identifier with the second communication identifier, the terminal 101 obtains the query command, the unbind command, or the bind command from a local database of the terminal 101 instead of the first server 102.

It should be noted that the first server 102 may be further responsible for updating and maintaining one or more of the query command, the unbind command, and the bind command. When the first server 102 detects that a service provider of a service changes any of the foregoing commands, the first server 102 saves a new command and deletes an old command. After that, if the first server 102 receives, from the terminal 101, a request for obtaining the command, the first server 102 sends the new command to the terminal 101.

Figure 2:
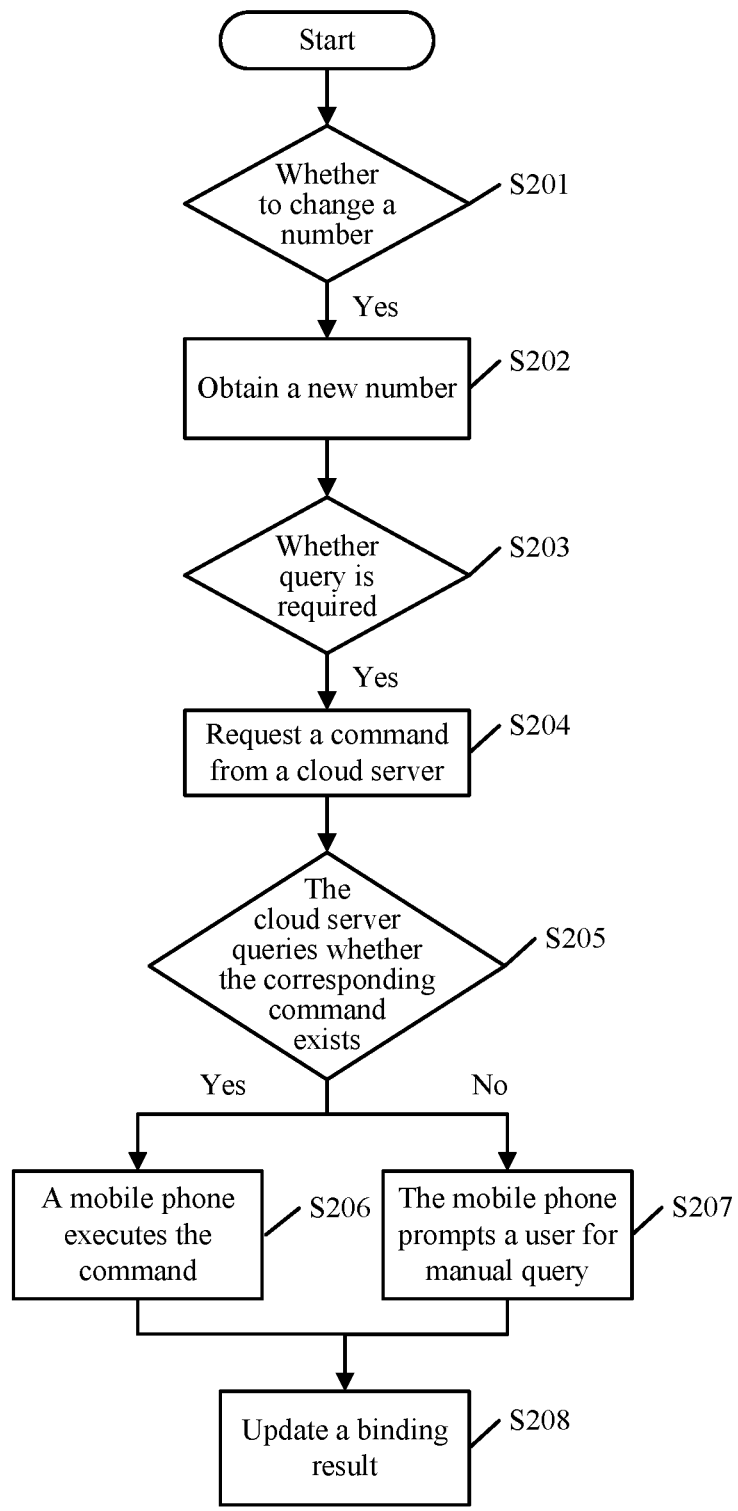
FIG. 2 is a schematic flowchart for communication identifier binding processing according to an embodiment of this application.

The terminal 101 may be specifically a mobile phone. The first server 102 may be specifically a trustworthy cloud server. The second server 103 may be specifically a server of an operator. The communication identifier may be specifically a mobile number. FIG. 2 is a schematic flowchart for communication identifier binding processing according to an embodiment of this application. In step S201, the mobile phone monitors whether a mobile number is changed. If the mobile phone detects a mobile number change operation performed by a user, the mobile phone may obtain a changed mobile number in step S202, and displays a user interface in step S203 to ask the user whether to query a first binding relationship between a service on the mobile phone and the old mobile number. If the user determines that a query is not needed, the mobile phone does not perform any operation. If the user determines to perform a query, the mobile phone may send a query request to the cloud server in step S204. The query request may be used to obtain a query command.

In step S205, after receiving the query request from the mobile phone, the cloud server queries whether the cloud server has the query command corresponding to the query request. If the cloud server has the query command, the cloud server sends the query command to the mobile phone, and the mobile phone performs step S206, and displays a latest query result on a mobile phone display screen in step S208, for viewing by the user. If the corresponding query command is not found, a case that the corresponding query command is not found is fed back to the cloud server, and the mobile phone displays a user interface in step S207 to prompt the user to manually query the corresponding query command.

Figure 4:
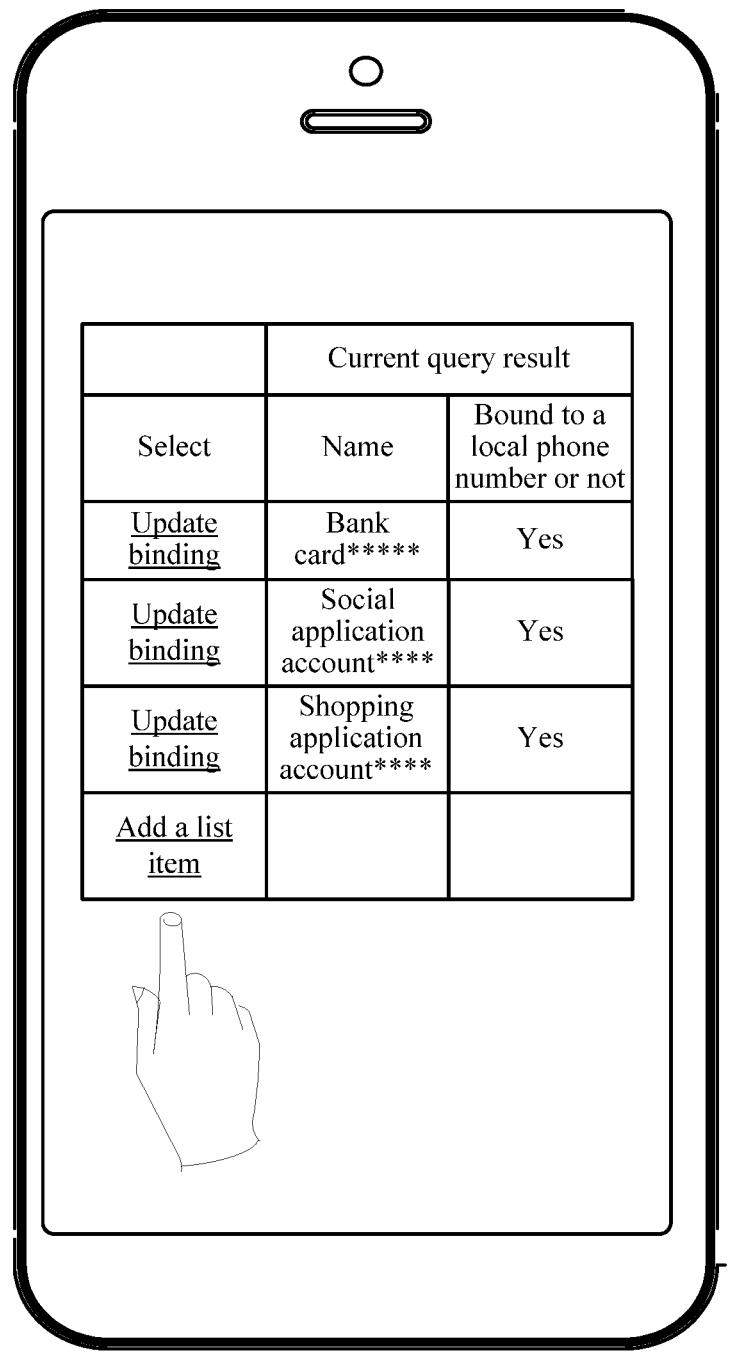
FIG. 4 (*a*) is a schematic diagram of a query result used for communication identifier binding according to an embodiment of this application.
Figure 4:
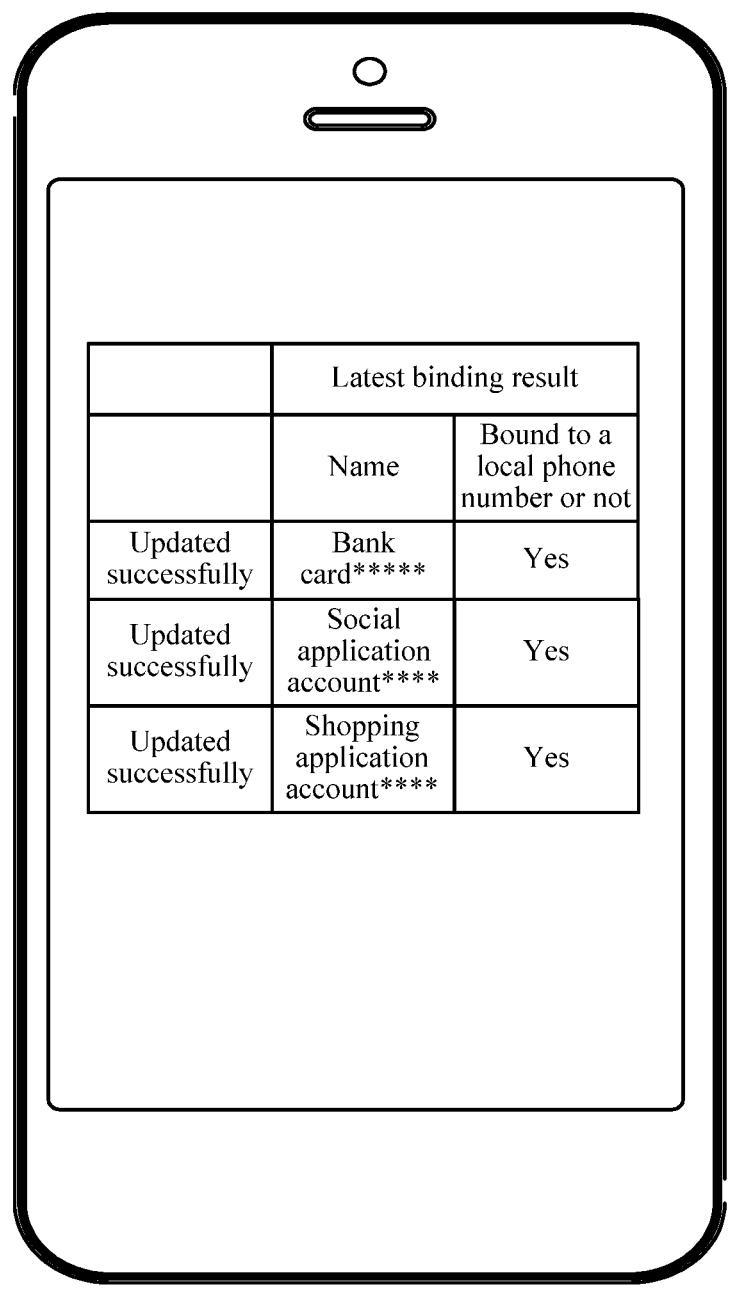

The query result may be displayed as a list item on an interface of the terminal 101, as shown in FIG. 4 (a). The user may perform an operation of manually adding a new list item to a list. When the user manually adds a list item, the mobile phone may automatically perform a query operation in step S204 to step S208. When it is determined that the to-be-added list item is already bound to the current mobile number, the list item to be added by the user may be added to the list. Otherwise, the mobile phone displays a prompt message indicating that adding the list item fails, and deletes the list item to be added by the user.

Specifically, the mobile phone executes the query command in step S206. To be specific, the mobile phone sends the query command to a server of an operator. After receiving the query command, the server of the operator may first query whether an account in the query command is bound to the mobile number. If the account in the query command is bound to the mobile number, the server of the operator may query whether other binding information including an SN number, a personal ID, and the like exists in the query command. If the binding information exists, the server of the operator replaces an originally stored SN number, personal ID, and the like with the SN number, personal ID, and the like included in the query command. If the binding information does not exist, the operator may add the SN number, personal ID, and other binding information included in the query command.

Figure 3:
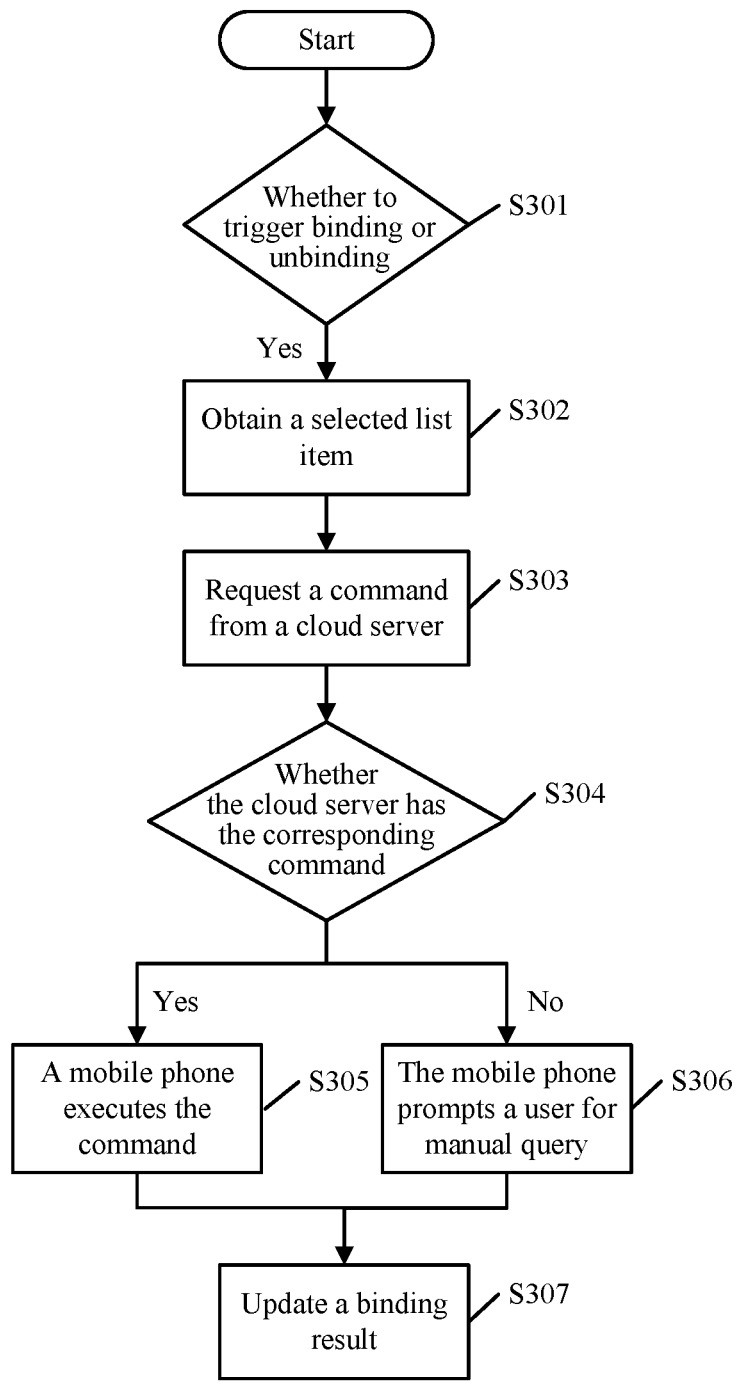
FIG. 3 is another schematic flowchart for communication identifier binding processing according to an embodiment of this application.

In addition, FIG. 3 is another schematic flowchart for communication identifier binding processing according to an embodiment of this application. After the mobile phone displays a queried list item, the mobile phone may further ask the user whether to trigger a binding or unbinding operation in step S301. When the user selects to perform the binding or unbinding operation, the user may select services that need to be unbound from an old mobile number, as shown in FIG. 4 (a), and bind the services to a new mobile number. The mobile phone may obtain selected list items based on a selection result of the user in step S302, and request to obtain a bind command and an unbind command from a cloud server in step S303. After receiving the bind command and the unbind command, the mobile phone may execute corresponding commands to complete binding and unbinding processing between the services and the mobile number.

In step S304, after receiving a binding update request from the mobile phone, the cloud server queries whether the cloud server has the unbind command and the bind command corresponding to the request. If the cloud server has the unbind command and the bind command, the cloud server sends the unbind command and the bind command to the mobile phone, and the mobile phone performs step S305, and displays a latest binding relationship on a mobile phone display screen in step S307, as shown in FIG. 4 (b), for viewing by the user. If the corresponding commands are not found, a case that the corresponding commands are not found is fed back to the mobile phone. The mobile phone displays a user interface in step S306 to prompt the user to manually query the corresponding bind command and/or unbind command.

The query command, bind command, or unbind command may be in a format such as "send: $(SN number)+$(personal ID)+$(account)+$(operation code) to xxxxxxx". $ means invoking an interface function in the mobile phone to obtain content in ( ); the SN number is a product serial number (SN) of the mobile phone; the account may be a bank card number or an application account ID, and the account is corresponding to a service selected by the user; the personal ID may be an identification ID that may identify a user identity, such as an ID card number; the operation code may indicate a user operation, such as query, binding, or unbinding, and the operation code does not need to be entered manually, but is automatically obtained by the mobile phone by determining whether the user performs a query, bind, or unbind operation; xxxxxx may be a short message number that is provided by an operator for binding a communication identifier.

Specifically, the mobile phone executes the unbind command in step S305. To be specific, the mobile phone sends the unbind command to the server of the operator. After receiving the unbind command, the server of the operator may first check whether the SN number, the personal ID, and the like included in the unbind command are consistent with an SN, a personal ID, and the like of a device corresponding to a bound service. If some or all of the items are consistent, the unbind operation may be performed.

Similarly, the mobile phone may also perform the foregoing processing procedure of executing the unbind command by the mobile phone, to execute the bind command in step S305. Details are not described herein.

Figure 5:
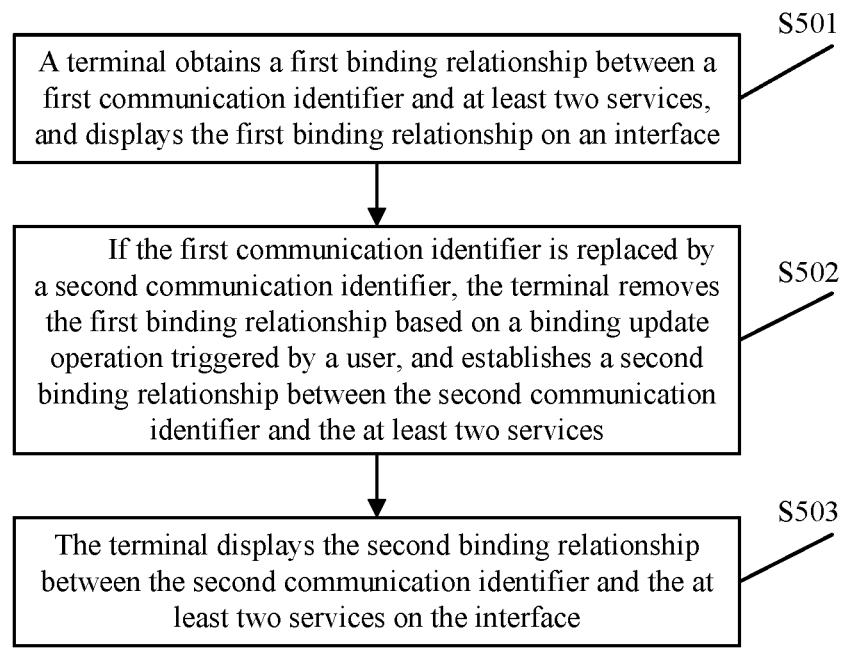
FIG. 5 is a schematic flowchart of a communication identifier binding processing method according to an embodiment of this application.

FIG. 5 is a schematic flowchart of a communication identifier binding processing method based on the network architecture used for communication identifier binding processing shown in FIG. 1, according to an embodiment of this application. The communication identifier binding processing method shown in FIG. 5 includes the following steps:

S501: A terminal obtains a first binding relationship between a first communication identifier and at least two services, and displays the first binding relationship on an interface.

Optionally, the at least two services may be application-type services or non-application-type services. The application-type services may be online shopping applications, social network applications, game applications, video applications, tool applications, or the like, and the non-application-type services may be specifically various types of bank cards (such as a credit card and a deposit card). This is not limited herein.

It should be further noted that the terminal may use a plurality of services, such as an application and a bank card, as bound items, and manage and maintain the bound items and a bound communication identifier in a unified manner, so that the terminal quickly obtains service information of a target service when the terminal detects communication identifier replacement, thereby improving binding and unbinding processing efficiency of the terminal.

A manner in which the terminal determines the at least two services may be determining that all services currently installed on the terminal are the at least two services to be queried; or the terminal may alternatively query all the services ever installed on the terminal, and use them as the at least two services to be queried; or the terminal may alternatively record services used by a user on a web browser or another client, and use the services as the at least two services to be queried.

A quantity of the services may be 2, 5, 20, or more. The quantity may be adjusted based on a data processing capability of the terminal, or be changed based on a quantity of selected services whose binding relationship is to be updated by the user. This is not limited herein.

In specific implementation, when the user selects and determines to obtain the first binding relationship between the first communication identifier and the at least two services on a user interface used for displaying a communication identifier binding operation, the terminal obtains and displays the first binding relationship on a display interface of the terminal based on an operation of the user.

The terminal may process a plurality of services simultaneously. For example, a key with "Select All" may be disposed on the display interface of the terminal. After the user triggers the "Select All" key, all services in the first binding relationship displayed on the interface may be used as the services whose binding relationship is to be updated. The terminal may perform binding or unbinding processing on these services simultaneously.

S502: If the first communication identifier is replaced by a second communication identifier, the terminal removes the first binding relationship based on a binding update operation triggered by a user, and establishes a second binding relationship between the second communication identifier and the at least two services.

Optionally, the first communication identifier and the second communication identifier may be email addresses, mobile numbers, international mobile subscriber identification numbers (International Mobile Subscriber Identification Number, IMSI) stored in communication cards, or international mobile equipment identification numbers (International Mobile Equipment Identification Number, IMEI) in the terminal. Certainly, the foregoing communication identifiers are examples only, and all communication identifiers are not enumerated, including but not limited to the foregoing optional identifiers.

In specific implementation, the terminal may read a communication identifier by reading data of a communication card replaced in a card slot of the terminal. When the user takes out, from the card slot of the terminal, a communication card carrying the first communication identifier, and puts in a communication card carrying the second communication identifier, the terminal may determine that it is detected that the communication identifier of the terminal has been changed from the first communication identifier to the second communication identifier.

In specific implementation, the user may further choose to update the binding relationship between the plurality of services and the communication identifier on a setting interface of the terminal.

For example, it is assumed that the terminal is provided with dual card slots or more than dual card slots, that is, the terminal may be equipped with two or more communication identifiers. When both of the dual card slots of the terminal house a communication card, the communication card of the first communication identifier is a primary card, and the communication card of the second communication identifier is a secondary card. Instead of exchanging positions of two communication cards, the user may choose to bind the target service bound to the second communication identifier to the first communication identifier on the user interface used for displaying a communication identifier binding operation. The terminal may perform binding relationship update processing based on selection of the user.

Alternatively, the terminal determines that the binding update operation performed by the user is detected. Specifically, the terminal displays a prompt message on the display interface, asking the user whether to bind the first communication identifier to the target service. After the user confirms binding, the terminal determines that the binding update operation performed by the user is detected.

In specific implementation, a manner in which the terminal removes the first binding relationship and establishes the second binding relationship between the second communication identifier and the at least two services may be specifically that the terminal obtains an unbind command related to the at least two services, and removes the first binding relationship according to the unbind command; and then the terminal obtains a bind command related to the at least two services, and establishes the second binding relationship according to the bind command.

It should be noted that there are the at least two services whose binding relationship needs to be updated, and the terminal obtains a plurality of unbind commands, and also a plurality of bind commands. The terminal may read installation time of the at least two services, unbind each service from the first communication identifier based on an installation time sequence and according to a corresponding unbind command, and bind each service to the second communication identifier according to a corresponding bind command. The terminal may further calculate use frequency of the at least two services, unbind the at least two services from the first communication identifier based on the use frequency and according to the corresponding unbind command, and bind the at least two services to the second communication identifier according to the corresponding bind command. The terminal may alternatively bind the at least two services to the first communication identifier randomly. This is not limited herein.

In specific implementation, after obtaining the unbind command and the bind command corresponding to the at least two services, the terminal sends the unbind command to a service provider or a short message operator. After receiving the unbind command, the service provider may first check whether a device SN number, a personal ID, and other information included in the command are consistent with the device SN number, the personal ID, and the other information corresponding to a bound bank card number, application account, and so on. If some or all of items are consistent, the service provider may directly perform the binding update operation, and feed back a binding update result to the terminal. If none of the items are consistent, the service provider may refuse to perform the binding update operation, and feed back an information error prompt message to the terminal. If a quantity of times for sending the unbind commands repeatedly to the service provider by the terminal reaches a specific value (for example, the unbind command is sent to times or more) and none of the items are consistent, the service provider may lock a personal account of the user.

Similarly, the terminal may perform, by following the foregoing processing procedure of unbinding the at least two services from the first communication identifier according to the unbind command, a processing procedure of binding the at least two services to the second communication identifier according to the bind command. Details are not described herein.

It should be noted that, if the terminal is provided with a single card slot, when the terminal detects that a SIM card in the card slot is replaced by the user, the terminal may perform an unbind operation by requesting from cloud the unbind command between the communication identifier in the old SIM card and the at least two services, instead of by using the communication identifier in the old SIM card. This may avoid unnecessary trouble caused by loss or damage of the old SIM card, improving efficiency.

It should be further noted that, if the terminal is provided with dual card slots and the communication identifiers of the terminal are the first communication identifier and the second communication identifier respectively, when the terminal detects that the user wants to bind a service, bound to the first communication identifier, to the second communication identifier, the terminal uses the first communication identifier to execute an obtained unbind command, and uses the second communication identifier to execute an obtained bind command, so as to implement unbind and bind operations.

S503: The terminal displays the second binding relationship between the second communication identifier and the at least two services on the interface.

Alternatively, after the terminal unbinds the at least two services from the first communication identifier and binds the at least two services to the second communication identifier, the terminal displays a user interface used for displaying a latest binding result, facilitating viewing by the user. In addition, the user may further select on this user interface whether to bind another service to the second communication identifier. After the user selects the another service and confirms the binding to the second communication identifier, the terminal may use the another service as a service whose binding relationship needs to be updated, and perform steps S501 to S503.

In this application, the terminal first obtains the at least two services bound to the first communication identifier, and displays the first binding relationship between the first communication identifier and the at least two services on the interface. Then, when the terminal detects that the first communication identifier is replaced by the second communication identifier, the terminal removes the first binding relationship based on the binding update operation triggered by the user, establishes the second binding relationship between the second communication identifier and the at least two services, and finally displays the second binding relationship on the interface. In this way, automatic unbinding and binding processing may be performed for the service that needs to be bound to a communication identifier, simplifying an operation step of the user, avoiding to memorize a complicated binding procedure by the user, implementing convenient association processing on the communication identifier and the service, and meeting a requirement of the user for automatic and intelligent quick unbinding and binding of the communication identifier.

Figure 6:
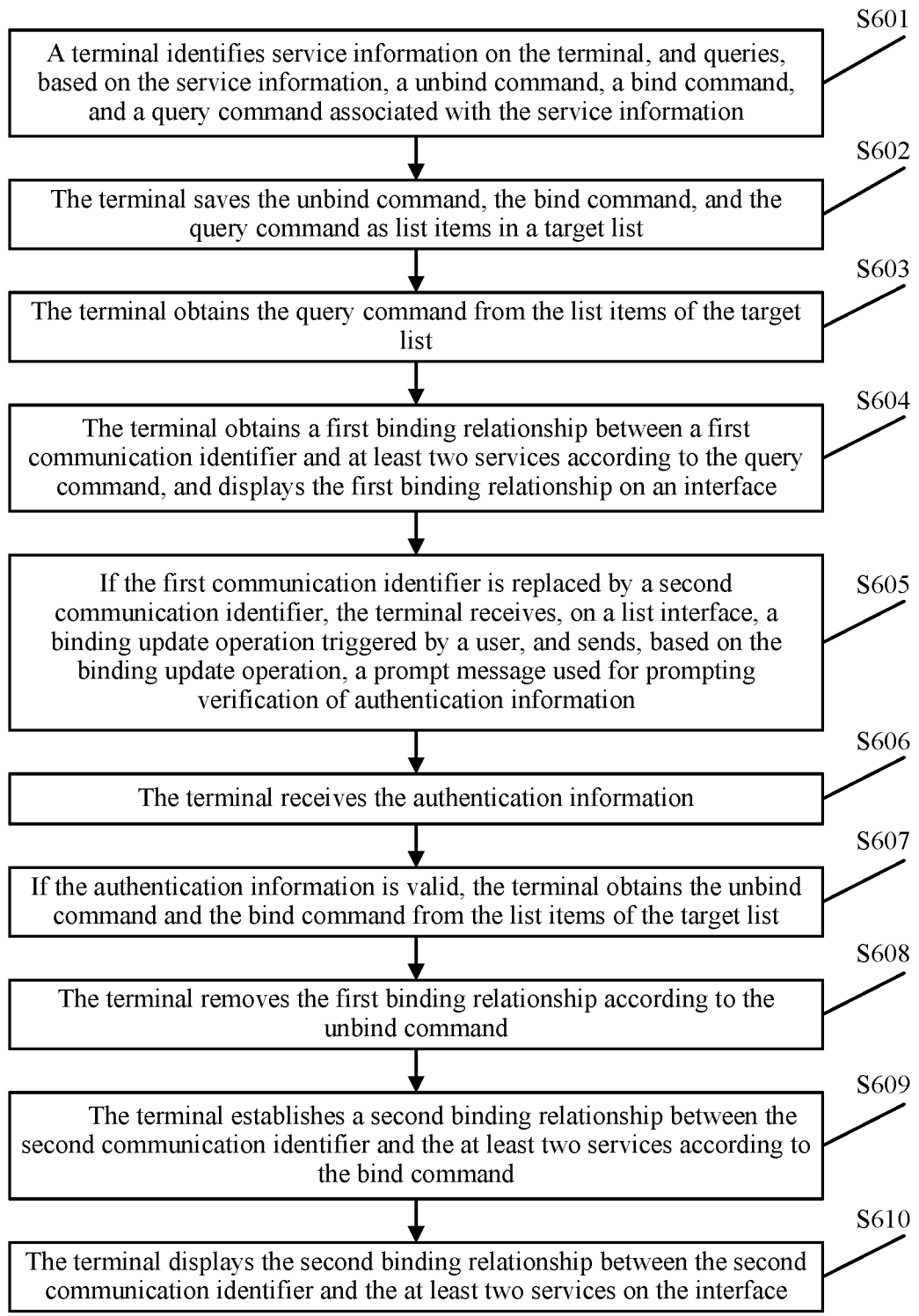
FIG. 6 is a schematic flowchart of another communication identifier binding processing method according to an embodiment of this application.

FIG. 6 is a schematic flowchart of another communication identifier binding processing method, based on the network architecture used for communication identifier binding processing shown in FIG. 1, according to an embodiment of this application. The communication identifier binding processing method described in this embodiment includes the following steps:

S601: A terminal identifies service information on the terminal, and queries, based on the service information, an unbind command, a bind command, and a query command associated with the service information.

It should be noted that the service information on the terminal may be related information about a service already installed or ever installed on the terminal, and is used to determine the service corresponding to the related information. For example, the service information may be a number representing a bank name code in a bank card number (for example, a card number of China Construction Bank starts with 621700), or information that identifies an application type and a provider in various applications (for example, an email address of a qq mailbox account is @qq.com), or a unique identification code of the service.

In specific implementation, the terminal may search an official website or another official channel corresponding to the service for the related query command, unbind command, and bind command used to bind a communication identifier and the service. Usually, the foregoing commands provided by an authenticated large service provider may be saved by the terminal on a cloud database or a local database, to ensure effectiveness and reliability of a binding process.

It should be further noted that the query command may be a command used to query a binding status between the service and the communication identifier. The terminal may invoke the query command to obtain a communication number of the communication identifier bound to the service, a time at which a binding relationship is established, a time at which the communication identifier bound to a target service is used last time, home location information of the communication number, operator information of the communication number, and so on. This is not limited herein.

It should be further noted that the unbind command and the bind command may be used to update a binding relationship between the communication identifier and the service. The terminal may invoke the unbind command and the bind command to implement binding relationship processing, without a need of a manual operation by the user, thereby simplifying an operation step of the user.

The unbind command, the bind command, and the query command may be in a format, including but not limited to the following listed formats: "$(device SN number)+$(account)+$(operation code) to xxxxxxx", or "send: $(personal ID)+$(account)+$(operation code) to xxxxxx", or "send: $(device SN number)+$(personal ID)+$(account)+$(operation code) to xxxxxx".

$ means invoking an interface function of the terminal to obtain content in ( ); an SN number, the account, the personal ID, and other information are included in the service information of the target service; the operation code indicates an operation of the user, and may be binding query performed by the user or determination by the user to perform a binding update operation, and the operation code does not need to be manually entered by the user, but is automatically obtained by the terminal by determining whether the user performs a query or binding update operation; xxxxxx may be a short message number that is provided by a service provider or an operator and that is used to bind the communication identifier.

S602: The terminal saves the unbind command, the bind command, and the query command as list items in a target list.

It should be noted that the target list stores the unbind command, the bind command, and the query command that are obtained by the terminal through query and that are related to various services. The target list may be stored on a trustworthy cloud server, or may be stored in the local database of the terminal.

When the user needs to update the binding relationship between the communication identifier and the service, the terminal may invoke the foregoing stored commands in advance to implement quick processing of the communication identifier and the service.

S603: The terminal obtains the query command from the list items of the target list.

It should be noted that the query command is used to query the binding relationship between the communication identifier and the service.

If the terminal does not automatically obtain the query command related to the service, the terminal may display a user interface used for prompting manual query of the binding status of the target service, to prompt the user to manually query the query command of the target service.

S604: The terminal obtains a first binding relationship between a first communication identifier and at least two services according to the query command, and displays the first binding relationship on an interface.

In specific implementation, after obtaining the query command, the terminal may display, on a display interface of the terminal, the first binding relationship between the first communication identifier and the at least two services obtained according to the query command, so that the user may obtain the binding status of the target service.

If any of the at least two services is not bound to the first communication identifier, the terminal may not display on the interface the service that is not bound to the first communication identifier, or the terminal may also display on the interface the binding status of the service that is not bound to the first communication identifier, as unbound. Certainly, the foregoing manners are examples only, and all manners are not enumerated, including but not limited to the foregoing optional manners.

S605: If the first communication identifier is replaced by a second communication identifier, the terminal receives, on a list interface, a binding update operation triggered by a user, and sends, based on the binding update operation, a prompt message used for prompting verification of authentication information.

The terminal may display the first binding relationship and the second binding relationship as list items on the list interface. After receiving the binding update operation triggered by the user on the list interface, the terminal may display a prompt box on the list interface to prompt the user to verify the authentication information.

It should be further noted that the first binding relationship or the second binding relationship may be obtained and maintained by the terminal, or be manually obtained by the user. The user may further perform an operation of adding or deleting the first binding relationship or the second binding relationship. When the user manually adds a list item, the terminal may automatically perform a query operation. When it is found that the to-be-added list item is already bound to the current terminal number, the list item to be added by the user may be added. Otherwise, the terminal displays an adding failure prompt message, and deletes the list item to be added by the user.

The authentication information may be a digital password, user fingerprint information, user iris information, user gesture information, user voice information, user face image, or the like. The user may select any type of authentication information provided by the terminal as information used for verifying an identity of the user. Alternatively, the authentication information may be considered consistent with a lock screen password of the terminal by default. The user does not need to separately set the authentication information required for an event of binding the target service and the first communication identifier.

Alternatively, the prompt box used for prompting the user to verify the authentication information may be a prompt box, with information "Enter Passcode", displayed on a display screen. The user may enter, based on content that the terminal requires to enter, corresponding information used for verifying the identity of the user.

Alternatively, the terminal may also send voice information, vibration information, or any combination of the voice information, the vibration information, and a user interface, used for prompting verification of the authentication information. This is not limited herein.

S606: The terminal receives the authentication information.

In specific implementation, the authentication information may be entered by the user.

The terminal may receive the authentication information by sensing an operation triggered by the user on the display screen of the terminal, or by receiving the voice information of the user through a microphone, or by receiving face information of the user through a camera, and so on. Certainly, the foregoing manners are examples only, and all manners are not enumerated, including but not limited to the foregoing optional manners.

S607: If the authentication information is valid, the terminal obtains the unbind command and the bind command from the list items of the target list.

In specific implementation, after receiving the authentication information entered by the user, the terminal may determine whether the authentication information matches the authentication information preset by the user, to prevent information disclosure of the terminal or avoid a misoperation by the user, improving security and reliability of the terminal. For example, if the authentication information used by the user in account registration of the target service is a preset digital password, the terminal can perform, only when the user enters the correct digital password, an operation of obtaining the service information of the target service.

When the terminal verifies that the authentication information is invalid, the terminal may display a user interface, prompting the user to enter the authentication information again. When a quantity of times the user enters invalid authentication information reaches a preset quantity of times (for example, to times), the terminal may perform screen lock processing, and the user is not allowed to perform any operation on the terminal within preset duration (for example, within 1 hour).

Alternatively, when the terminal verifies that the authentication information is invalid, the terminal may display a user interface, prompting the user to enter the authentication information again. A quantity of times the user may enter the authentication information is not limited. Once the entered authentication information is valid, the terminal may perform an operation of obtaining the unbind command and the bind command from the list items of the target list.

S608: The terminal removes the first binding relationship according to the unbind command.

It should be noted that the unbind command may vary with a requirement of a service provider of a service. For example, if the service provider requires that a personal ID used in registration of the service, a mobile number used in the registration, a personal account used for registering the service, and other information be provided, the unbind command may include the foregoing information that is required to be provided. The information may be automatically obtained by the terminal by using an interface function preset by the terminal, without a need of entering the information manually by the user.

In specific implementation, after obtaining the unbind command, the terminal may send an unbind request to the service provider of the service according to the unbind command. After receiving the unbind request, the service provider verifies whether the unbind request is valid. If a verification result is that the unbind request is valid, the target service provider unbinds the target service from the second communication identifier, and feeds back an unbinding processing result to the terminal.

After the service is unbound from the first communication identifier, the terminal may use the second communication identifier as a communication identifier that needs to be bound to the service, and perform step S609.

S609: The terminal establishes a second binding relationship between the second communication identifier and the at least two services according to the bind command.

If the terminal does not automatically obtain any of the bind command or the unbind command of the target service, the terminal may display a user interface used for prompting manual update of the binding status between the service and the communication identifier, to prompt the user to manually query a related command of the service. The terminal may also display, on the user interface, association information used to update the binding relationship between the communication identifier and the at least two services, to prompt the user to complete, based on the association information, an operation of manually updating the binding relationship between the communication identifier and the at least two services.

It should be noted that the association information includes at least a searching result that is obtained from a network through searching and that is used for establishing the binding relationship between the communication identifier and the at least two services. For example, when updating binding information of a music application, the terminal does not find a related unbind command. Then, the terminal may search for the related unbind command of the music application on the network by using an operator network or the Internet, and display a query result on the user interface.

In specific implementation, a processing manner in which the terminal establishes the second binding relationship according to the bind command may be similar to a manner of removing the first binding relationship according to the unbind command. The terminal may execute a corresponding unbind command based on different requirements of the service provider, and details are not described herein.

S610: The terminal displays the second binding relationship between the second communication identifier and the at least two services on the interface.

The first binding relationship and the second binding relationship may be displayed as lists.

It should be noted that the list may be maintained by the local database of the terminal, or may be maintained and updated by the cloud database of the server. A list item in the list may be a bank card or an application account ever bound to the terminal, so that information such as the bank card or the application account may be displayed in the list. The user may learn a binding status between a service and a communication identifier on the terminal by querying the list, so as to manage the service on the terminal in a unified manner.

In specific implementation, when the terminal detects that a relationship between the service and the communication identifier changes, the terminal may automatically replace an original binding relationship with a new binding relationship.

Alternatively, the user may manually add or delete a list item to/from the list. Before the user adds or deletes the list item, the terminal may require the user to verify the authentication information. If the verification succeeds, the user may perform an operation of adding or deleting the list item to/from a query list. When the user adds a list item, the terminal may automatically perform a query operation. When the to-be-added list item is already bound to the first communication identifier, the list item may be added successfully. Otherwise, the list item fails to be added and is deleted.

It should be noted that, in this embodiment of this application, the user needs to perform only selection and confirmation operations, and does not need to manually perform a complicated unbinding and binding procedure. Specifically, when detecting communication identifier replacement, the terminal prompts the user whether to query the binding status of the first communication identifier. After the user confirms query, the terminal displays the binding status of the first communication identifier, and again asks the user whether to update the binding status. The user selects and confirms a service whose binding status is to be updated, or all services displayed by default. The terminal may unbind these services from the first communication identifier, and bind these services to the second communication identifier.

In this application, the terminal first saves the related unbind command, query command, and bind command of the service on the terminal, queries the first binding relationship between the first communication identifier and the at least two services according to the query command, and displays the first binding relationship. Then, after the user replaces the first communication identifier with the second communication identifier and the authentication succeeds, the terminal removes the first binding relationship according to the unbind command, establishes the second binding relationship between the second communication identifier and the at least two services according to the bind command, and displays the second binding relationship on the interface. This implements a communication identifier unbinding and binding procedure, improves security and reliability of the terminal, implements convenient association processing on the communication identifier and the service, and performs unified management and maintenance on the service and the communication identifier. The user does not need to memorize a complicated unbinding and binding procedure, simplifying an operation step of the user.

The foregoing describes in detail the methods in the embodiments of this application. To better implement the foregoing solutions in the embodiments of this application, the following correspondingly further provides a related device used to implement the foregoing solutions.

Figure 7:
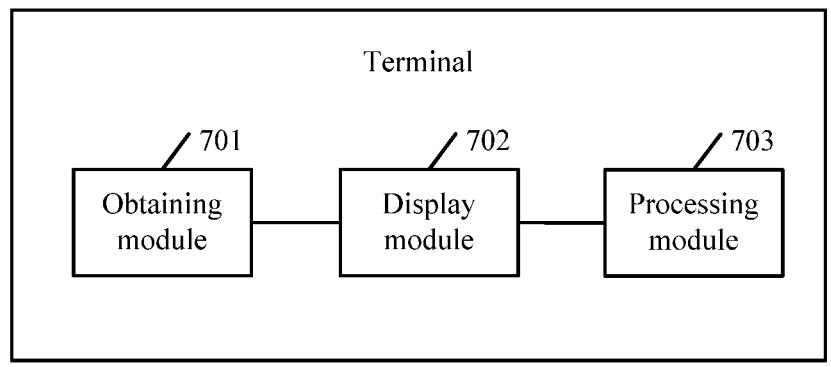
FIG. 7 is a schematic structural diagram of a terminal according to an embodiment of this application.

FIG. 7 is a schematic structural diagram of a terminal according to an embodiment of this application. The terminal described in this embodiment includes an obtaining module 701, a display module 702, and a processing module 703.

The obtaining module 7001 is configured to obtain a first binding relationship between a first communication identifier and at least two services.

The display module 702 is configured to display the first binding relationship on an interface.

The processing module 703 is configured to, if the first communication identifier is replaced by a second communication identifier, remove the first binding relationship based on a binding update operation triggered by a user, and establish a second binding relationship between the second communication identifier and the at least two services.

The display module 702 is further configured to display the second binding relationship between the second communication identifier and the at least two services on the interface.

A manner of determining the at least two services may be that the processing module 703 uses all services currently installed on the terminal as the at least two services whose first binding relationship with the first communication identifier is to be queried; or the obtaining module 701 first queries all the services ever installed on the terminal, and then the processing module 703 uses all the services as the at least two services; or the processing module 703 may alternatively record services used by the user on a web browser or another client, and use the services as the at least two services.

Alternatively, when detecting, on a user interface used for displaying a communication identifier binding operation, that the user needs to update a binding relationship between a service and a communication identifier, the processing module 703 may also perform processing of removing the first binding relationship and establishing the second binding relationship.

Alternatively, the at least two services include an application-type service and a non-application-type service. The application-type service at least includes one or more of a social application, a shopping application, a game application, a video application, and a tool application; and the non-application-type service includes at least a bank card.

Alternatively, the first communication identifier and the second communication identifier include at least one or more of the following: an email address, a mobile number, and an international mobile subscriber identity.

In this application, the obtaining module 701*o* first obtains the at least two services bound to the first communication identifier, and the display module 702 displays the first binding relationship between the first communication identifier and the at least two services on the interface. Then, when the processing module 703 detects that the first communication identifier is replaced by the second communication identifier, the processing module 703 removes the first binding relationship based on the binding update operation triggered by the user, and establishes the second binding relationship between the second communication identifier and the at least two services. Finally, the display module 702 displays the second binding relationship on the interface. In this way, automatic unbinding and binding processing may be performed for the service that needs to be bound to a communication identifier, simplifying an operation step of the user, avoiding to memorize a complicated binding procedure by the user, implementing convenient association processing on the communication identifier and the service, and meeting a requirement of the user for automatic and intelligent quick unbinding and binding of the communication identifier.

Figure 8:
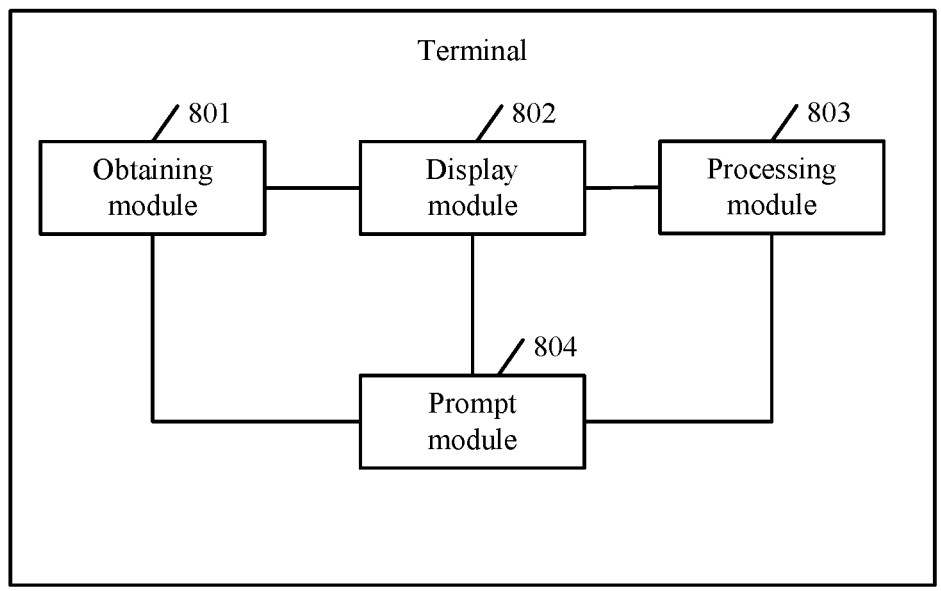
FIG. 8 is a schematic structural diagram of another terminal according to an embodiment of this application.

FIG. 8 is a schematic structural diagram of another terminal according to an embodiment of this application. The terminal described in this embodiment includes an obtaining module 801, a display module 802, a processing module 803, and a prompt module 804.

The obtaining module 801 is configured to obtain a first binding relationship between a first communication identifier and at least two services.

Alternatively, the terminal may further include the prompt module 804, configured to prompt, if an unbind command or a bind command is not obtained, a user to manually update a binding relationship between the communication identifier and the at least two services.

The display module 802 is configured to display the first binding relationship on an interface.

The processing module 803 is configured to, if the first communication identifier is replaced by a second communication identifier, remove the first binding relationship based on a binding update operation triggered by the user, and establish a second binding relationship between the second communication identifier and the at least two services.

Alternatively, the interface may be a list interface. The first binding relationship or the second binding relationship is displayed as a list item on the list interface.

The processing module 803 is specifically configured to receive, on the list interface, the binding update operation triggered by the user, remove the first binding relationship based on the binding update operation, and establish the second binding relationship between the second communication identifier and the at least two services.

Alternatively, the processing module 803 is specifically configured to obtain the unbind command and the bind command from list items of a target list based on the binding update operation triggered by the user, remove the first binding relationship according to the unbind command, and establish the second binding relationship between the second communication identifier and the at least two services according to the bind command.

Alternatively, the obtaining module 801 is specifically configured to: obtain a query command from the list items, where the query command is used to query a binding relationship between a service and a communication identifier; and obtain the first binding relationship between the first communication identifier and the at least two services according to the query command.

The unbind command, the bind command, and the query command are obtained through query based on service information on the terminal, and are saved as list items in the target list.

The display module 802 is further configured to display the second binding relationship between the second communication identifier and the at least two services on the interface.

Alternatively, the terminal may further include the prompt module 804, configured to prompt, if the unbind command or the bind command is not obtained, the user to manually update the binding relationship between the communication identifier and the at least two services.

The display module 802 is further configured to display association information used to update the binding relationship between the communication identifier and the at least two services, to prompt the user to complete, based on the association information, an operation of manually updating the binding relationship between the communication identifier and the at least two services.

The association information includes at least a searching result that is obtained from a network through searching and that is used for establishing the binding relationship between the communication identifier and the at least two services.

Alternatively, the prompt module 804 is further configured to send, based on the binding update operation triggered by the user, a prompt message used for prompting verification of authentication information.

The obtaining module 801 is further configured to receive the authentication information.

The processing module 803 is specifically configured to: if the authentication information is valid, remove the first binding relationship between the first communication identifier and the at least two services, and establish the second binding relationship with the second communication identifier.

In this application, the obtaining module 801 first obtains the first binding relationship between the first communication identifier and the at least two services according to the query command, and the display module 802 displays the first binding relationship. Then, after the processing module 803 detects that the user replaces the first communication identifier with the second communication identifier and the authentication succeeds, the processing module 803 removes the first binding relationship according to the unbind command, and establishes the second binding relationship between the second communication identifier and the at least two services according to the bind command. The display module 802 displays the second binding relationship on the interface. This implements a communication identifier unbinding and binding procedure, improves security and reliability of the terminal, implements convenient association processing on the communication identifier and the service, and performs unified management and maintenance on the service and the communication identifier. The user does not need to memorize a complicated unbinding and binding procedure, simplifying an operation step of the user.

Figure 9:
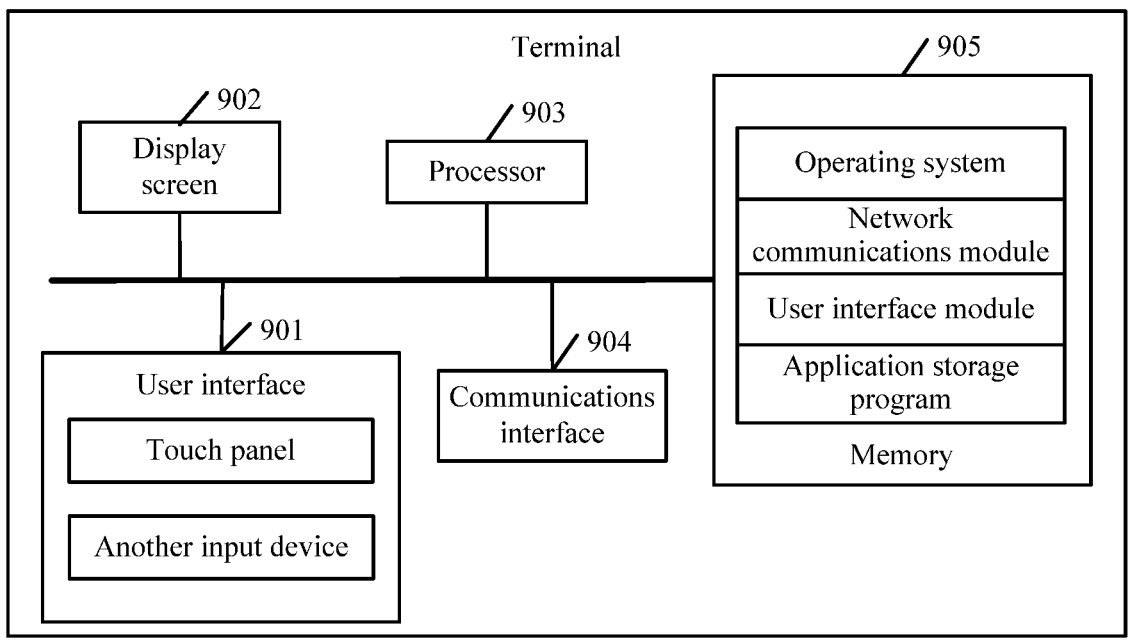
FIG. 9 is a schematic structural diagram of still another terminal according to an embodiment of this application.

FIG. 9 is a schematic structural diagram of still another terminal according to an embodiment of this application. The terminal described in this embodiment includes: a user interface 901, a display screen 902, a processor 903, a communications interface 904, and a memory 905. The user interface 901, the display screen 902, the processor 903, the communications interface 904, and the memory 905 may be connected by using a bus or may be connected in another manner.

The processor 903 may be a central processing unit (CPU), a network processor (NP), or a combination of the CPU and the NP. The processor 903 may alternatively be a core, used to implement communication identifier binding, in a multi-core CPU or a multi-core NP.

The processor 903 may be a hardware chip. The hardware chip may be an application-specific integrated circuit (ASIC), a programmable logic device (PLD), or a combination thereof. The foregoing PLD may be a complex programmable logic device (CPLD), a field-programmable logic gate array (FPGA), a generic array logic (GAL), or any combination thereof.

The communications interface 904 may be used to receive and send information or exchange signaling, and receive and send signals. Especially, the communications interface 904 may communicate with another device through radio communication and a network. The radio communication may use any communications standard or protocol, including but not limited to GSM (Global System of Mobile communication, global system for mobile communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, SMS (Short Messaging Service, Short Messaging Service), and so on.

The user interface 901 may be configured to receive input digital or character information, and generate key signal input related to a user setting and function control of the terminal. Specifically, the user interface 901 may include a touch panel and another input device. The touch plane, also called a touchscreen, may collect a touch operation (for example, an operation performed by a user on the touch panel or near the touch panel by using a finger, a stylus, or any proper object or accessory) of the user on or near the touch panel, and drive a corresponding connection apparatus based on a preset program.

Optionally, the touch panel may include two parts: a touch detection apparatus and a touch controller. The touch detection apparatus detects a touch position of the user, detects a signal generated by a touch operation, and transmits the signal to the touch controller; the touch controller receives touch information from the touch detection apparatus, converts the information into contact coordinates, sends the coordinates to the processor, and receives and executes a command sent from the processor. In addition, the touch panel may be implemented by using various types such as resistance, capacitance, infrared, and surface acoustic wave. Besides the touch panel, the user interface 901 may further include another input device. Specifically, the another input device may include but is not limited to one or more of a physical keyboard, a function key (such as a volume control key and a switch key), a trackball, a mouse, a joystick, and so on.

The display screen 902 may be configured to display information entered by the user, information provided to the user, and various menus of the terminal. The display screen 902 may be configured in a form such as an LCD (Liquid Crystal Display, liquid crystal display) or an OLED (Organic Light-Emitting Diode, organic light-emitting diode). Further, the touch panel may cover the display screen 902. When detecting a touch operation on or near the touch panel, the touch panel transmits the operation to the processor to determine a type of a touch event. Then, the processor provides corresponding visual output on the display screen 902 based on the type of the touch event. Although the touch panel and the display screen 902 implements input and output functions of the terminal as two independent components in FIG. 9, the touch panel and the display screen 902 may be integrated to implement the input and output functions of the terminal in some embodiments.

The memory 905 may mainly include a program storage partition and a data storage partition. The program storage partition may store an operating system, an application storage program (such as a list storage function and an image play function) required by at least one function, and so on; the data storage partition may store data (such as audio data and text data) created based on use by the terminal and so on, and may include a network communications module, a user interface module, and so on. Moreover, the memory may include a high speed random access memory, and may also include a nonvolatile memory, for example, at least one disk storage component, flash memory component, or another volatile solid-state storage component.

The memory 905 is further configured to store a program instruction. The processor 903 may invoke the program instruction stored in the memory 905 to implement a communication identifier binding processing method shown in this embodiment of this application.

Specifically, the processor 903 invokes the program instruction stored in the memory 905 to perform the following steps: obtaining a first binding relationship between a first communication identifier and at least two services, and displaying the first binding relationship on an interface; if the first communication identifier is replaced by a second communication identifier, removing the first binding relationship based on a binding update operation triggered by the user, and establishing a second binding relationship between the second communication identifier and the at least two services; and displaying the second binding relationship between the second communication identifier and the at least two services on the interface.

In this embodiment of this application, a method executed by the processor is described from a perspective of the processor. It may be understood that the processor needs to cooperate with another hardware structure in order to execute the method in this embodiment of this application. For example, for interaction between the terminal and another device or server, such as interaction signaling for removing the binding relationship between the first communication identifier and the service and interaction signaling for establishing the binding relationship between the second communication identifier and the service, the processor 903 controls the communications interface 904 to receive and send related signaling, the processor 903 may control the display screen 902 to display the first binding relationship on the interface, and so on. This embodiment of this application does not detail and limit a specific implementation procedure.

Alternatively, the at least two services include an application-type service and a non-application-type service. The application-type service at least includes one or more of a social application, a shopping application, a game application, a video application, and a tool application; and the non-application-type service includes at least a bank card.

Alternatively, the processor 903 is specifically configured to control, based on the binding update operation triggered by the user, the communications interface 904 to obtain the unbind command and the bind command from list items, remove the first binding relationship according to the unbind command, and establish the second binding relationship between the second communication identifier and the at least two services according to the bind command.

Alternatively, the interface is a list interface. The first binding relationship or the second binding relationship is displayed as a list item on the list interface.

The processor 903 is specifically configured to control, on the list interface, the user interface 901 to receive the binding update operation triggered by the user, remove the first binding relationship based on the binding update operation, and establish the second binding relationship between the second communication identifier and the at least two services.

Alternatively, if the communications interface 904 does not obtain the unbind command or the bind command, the processor 903 is further configured to control the display screen 902 to prompt the user to manually update the binding relationship between the communication identifier and the at least two services.

The processor 903 is further configured to control the display screen 902 to display association information used to update the binding relationship between the communication identifier and the at least two services, to prompt the user to complete, based on the association information, an operation of manually updating the binding relationship between the communication identifier and the at least two services.

The association information includes at least a searching result that is obtained from a network through searching and that is used for establishing the binding relationship between the communication identifier and the at least two services.

The processor 903 is further configured to control the display screen 902 to display the second binding relationship between the second communication identifier and the at least two services on the interface.

Alternatively, the memory 905 may be configured to save the unbind command, the bind command, and a query command as list items in a target list, and the unbind command, the bind command, and the query command are obtained through query based on service information on the terminal.

The processor 903 is specifically configured to obtain the unbind command and the bind command from the list items of the target list based on the binding update operation triggered by the user, remove the first binding relationship according to the unbind command, and establish the second binding relationship between the second communication identifier and the at least two services according to the bind command.

Alternatively, the processor 903 is further configured to control the user interface 901 to detect the binding update operation triggered by the user, control the display screen 902 to send a prompt message used for prompting verification of authentication information, and control the user interface 901 to receive the authentication information. If the authentication information is valid, the processor 903 removes the first binding relationship between the first communication identifier and the at least two services, and establishes the second binding relationship with the second communication identifier.

Alternatively, the first communication identifier and the second communication identifier include at least one or more of the following: an email address, a mobile number, and an international mobile subscriber identity.

Alternatively, the processor 903 is specifically configured to: control the communications interface 904 to obtain the query command from the list items, where the query command is used to query the binding relationship between the service and the communication identifier; and obtain the first binding relationship between the first communication identifier and the at least two services according to the query command.

Based on the same invention conception, a problem resolving principle of the terminal provided in this embodiment of this application is similar to the method embodiment of this application. Therefore, for implementation of the terminal, refer to implementation of the method. For brevity, details are not described herein.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (Read-Only Memory, ROM), a random access memory (Random Access Memory, RAM), or the like.

What is claimed is:

1. A method, comprising:
    obtaining, by a terminal device, a first binding relationship between a first communication identifier and at least two services;
    displaying, by the terminal device, the first binding relationship on an interface; and
    based at least in part on the first communication identifier being replaced by a second communication identifier and based on a binding update operation:
        removing, by the terminal device according to an unbind command, the first binding relationship; and
        establishing, by the terminal device according to a bind command, a second binding relationship between the second communication identifier and the at least two services; and
    displaying, on the interface by the terminal device, the second binding relationship between the second communication identifier and the at least two services.

2. The method according to claim 1, wherein:
    the interface is a list interface;
    the first binding relationship or the second binding relationship is displayed as a list item on the list interface; and
    the method comprises receiving, via the list interface, the binding update operation.

3. The method according to claim 1, wherein:
    the unbind command, the bind command, and a query command are saved as list items in a target list, the unbind command, the bind command, and the query command having been obtained through a query based on service information stored on the terminal device; and
    the method further comprises, based at least in part on the first communication identifier being replaced by the second communication identifier and based on the binding update operation, obtaining the unbind command and the bind command from the list items of the target list.

4. The method according to claim 3, wherein obtaining the first binding relationship between the first communication identifier and the at least two services comprises:
    obtaining the query command from the list items; and
    obtaining, according to the query command, the first binding relationship between the first communication identifier and the at least two services.

5. The method according to claim 1, wherein the method further comprises prompting, in response to the unbind command or the bind command not being obtained, a manual update to the first binding relationship between the first communication identifier and the at least two services, association information for updating the first binding relationship between the first communication identifier and the at least two services being displayed, the association information comprising a searching result obtained via a communication network and for establishing the second binding relationship between the second communication identifier and the at least two services.

6. The method according to claim 1, further comprising, before removing the first binding relationship, and establishing the second binding relationship between the second communication identifier and the at least two services:

sending, based on the binding update operation, a prompt message to prompt verification of authentication information;

receiving the authentication information; and removing, in response to the authentication information being valid, the first binding relationship between the first communication identifier and the at least two services, and establishing the second binding relationship with the second communication identifier.

7. The method according to claim 1, wherein:

the at least two services comprise an application-type service and a non-application-type service;

the application-type service comprises a social application, a shopping application, a game application, a video application, a tool application, or a combination thereof; and the non-application-type service comprises a bank card.

8. The method according to claim 1, wherein each of the first communication identifier and the second communication identifier comprises:

an email address;

a mobile number;

an international mobile subscriber identity; or a combination of an email address, a mobile number, and an international mobile subscriber identity.

9. A terminal, comprising:

a non-transitory memory storage comprising instructions; and one or more processors coupled to the memory storage, wherein the one or more processors execute the instructions to:

obtain a first binding relationship between a first communication identifier and at least two services, and displaying the first binding relationship on an interface;

based at least in part on the first communication identifier being replaced by a second communication identifier and based on a binding update operation:

remove, according to an unbind command, the first binding relationship; and establish, according to a bind command, a second binding relationship between the second communication identifier and the at least two services; and display, on the interface, the second binding relationship between the second communication identifier and the at least two services.

10. The terminal according to claim 9, wherein:

the interface is a list interface;

the first binding relationship or the second binding relationship is displayed as a list item on the list interface; and the one or more processors further execute the instructions to receive, via the list interface, the binding update operation.

11. The terminal according to claim 9, wherein:

the unbind command, the bind command, and a query command are saved as list items in a target list, the unbind command, the bind command, and the query command having been obtained through a query based on service information stored on the terminal; and the one or more processors further execute the instructions to, based at least in part on the first communication identifier being replaced by the second communication identifier and based on the binding update operation, obtain obtaining the unbind command and the bind command from the list items of the target list.

12. The terminal according to claim 11, wherein obtaining the first binding relationship between the first communication identifier and the at least two services comprises:

obtaining the query command from the list items; and obtaining, according to the query command, the first binding relationship between the first communication identifier and the at least two services.

13. The terminal according to claim 9, wherein the one or more processors further execute the instructions to prompt, in response to the unbind command or the bind command not being obtained, a manual update to the first binding relationship between the first communication identifier and the at least two services, association information for updating the first binding relationship between the first communication identifier and the at least two services being displayed, the association information comprising a searching result obtained via a communication network and for establishing the second binding relationship between the second communication identifier and the at least two services.

14. The terminal according to claim 9, wherein the one or more processors further execute the instructions to, before removing the first binding relationship, and establishing the second binding relationship between the second communication identifier and the at least two services:

send, based on the binding update operation, a prompt message to prompt verification of authentication information;

receive the authentication information; and remove, in response to the authentication information being valid, the first binding relationship between the first communication identifier and the at least two services, and establishing the second binding relationship with the second communication identifier.

15. The terminal according to claim 9, wherein:

the at least two services comprise an application-type service and a non-application-type service;

the application-type service comprises a social application, a shopping application, a game application, a video application, a tool application, or a combination thereof; and the non-application-type service comprises a bank card.

16. The terminal according to claim 9, wherein each of the first communication identifier and the second communication identifier comprises:

an email address;

a mobile number;

an international mobile subscriber identity; or a combination of an email address, a mobile number, and an international mobile subscriber identity.

17. A non-transitory computer-readable media storing computer instructions that, when executed by one or more processors, cause the one or more processors to perform operations comprising:

obtaining a first binding relationship between a first communication identifier and at least two services;

displaying the first binding relationship on an interface; and based at least in part on the first communication identifier being replaced by a second communication identifier and based on a binding update operation:

removing, according to an unbind command, the first binding relationship; and establishing, according to a bind command, a second binding relationship between the second communication identifier and the at least two services; and displaying, on the interface, the second binding relationship between the second communication identifier and the at least two services.

18. The non-transitory computer-readable media according to claim 17, wherein:
the unbind command, the bind command, and a query command are saved as list items in a target list, the unbind command, the bind command, and the query command having been obtained through a query based on service information stored on a terminal device; and
the operations further comprise, based at least in part on the first communication identifier being replaced by the second communication identifier and based on the binding update operation, obtaining the unbind command and the bind command from the list items of the target list.

19. The non-transitory computer-readable media according to claim 17, wherein the operations further comprise prompting, in response to the unbind command or the bind command not being obtained, a manual update to the first binding relationship between the first communication identifier and the at least two services, association information for updating the first binding relationship between the first communication identifier and the at least two services being displayed, the association information comprising a searching result obtained via a communication network and for establishing the second binding relationship between the second communication identifier and the at least two services.

20. The non-transitory computer-readable media according to claim 17, wherein:
the at least two services comprise an application-type service and a non-application-type service;
the application-type service comprises a social application, a shopping application, a game application, a video application, a tool application, or a combination thereof; and
the non-application-type service comprises a bank card.

\* \* \* \* \*

UNITED STATES PATENT AND TRADEMARK OFFICE
CERTIFICATE OF CORRECTION

| | |
|---|---|
| PATENT NO. | : 10,999,721 B2 |
| APPLICATION NO. | : 16/464939 |
| DATED | : May 4, 2021 |
| INVENTOR(S) | : Haoran Li |

Page 1 of 1

It is certified that error appears in the above-identified patent and that said Letters Patent is hereby corrected as shown below:

On the Title Page

Item (87) Line 1 and 2; delete "Jul. 6, 2018" insert --Jun. 7, 2018--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*